United States Patent [19]

Hinds

[11] Patent Number: 4,865,495
[45] Date of Patent: Sep. 12, 1989

[54] FLUID INDUCER

[75] Inventor: Buford R. Hinds, Claremore, Okla.

[73] Assignee: Energy Exchanger Co., Tulsa, Okla.

[21] Appl. No.: 225,358

[22] Filed: Jul. 28, 1988

[51] Int. Cl.⁴ .............................................. B23B 47/34
[52] U.S. Cl. ..................................... 408/56; 408/57; 409/136
[58] Field of Search ............................ 408/56, 57, 59; 409/135, 136; 279/20; 285/190

[56] References Cited

U.S. PATENT DOCUMENTS

| | | | |
|---|---|---|---|
| 594,330 | 11/1897 | Cox, Jr. | 279/20 |
| 1,028,623 | 6/1912 | Smith | 408/59 |
| 3,561,299 | 2/1971 | Brisk et al. | 408/59 |
| 4,570,952 | 2/1986 | Heimbigner et al. | 408/56 |
| 4,693,646 | 9/1987 | Andrews | 409/136 |

FOREIGN PATENT DOCUMENTS 448687 4/1968 Switzerland .......................... 408/56

Primary Examiner—Gil Weidenfeld
Assistant Examiner—Daniel W. Howell

[57] ABSTRACT

A fluid inducer for mounting to an oil-hole drill sleeve includes at least two removable sections for easy replacement of internal O-rings without the need for removal of the drill sleeve or drill bit from the drilling machine. The inducer includes a cylindrical main inducer body having an inner bore around which are horizontally disposed at least two space O-rings that define an annular space about a lower position of the drill sleeve. A cylindrical bearing body is removably connected to the inducer body and includes an inner bore for retaining at least one annular bearing assembly that is mounted to the drill sleeve.

4 Claims, 2 Drawing Sheets

FLUID INDUCER

BACKGROUND OF THE INVENTION

1. Field of the Invention

The present invention relates to equipment used in material drilling and, more particularly, to such equipment that is used to introduce a drilling fluid, such as oil, water or air, into a rotating drill sleeve that holds a drill bit with fluid passageways.

2. Setting of the Invention

In the use of large size drill presses, a drill bit retention device has been developed called a drill sleeve. The drill sleeve is generally a single piece of metal with a tapered upper portion that includes a tapered bore into which is inserted a drill bit. The sizes of drill bits and drill sleeves vary, but usually have a uniform tapering designation, such as, for example, having a Morse 5–3 taper.

Since there are no moving parts within the typical drill sleeve, the drill sleeves have very long operational lives. However, a drilling improvement has become quite prevalent which tends to reduce the operational lives of the drill sleeves. This development is called fluid drilling or "oil-hole" drilling, wherein a horizontal hole is included within the lower portion of the drill sleeve to provide a fluid path from a concentric outer fluid plenum or single piece fluid inducer through the hole and into one or more vertical fluid passageways through the drill bit. The application of fluid, such as oil, water, air or combinations of these, at the point of contact of a material with the drill bit greatly increases the drilling efficiency.

A problem with such fluid inducers and drill sleeves is that the fluid inducer remains stationary in relation to the rapidly rotating drill press spindle, drill sleeve (which extends through the fluid inducer) and drill bit. Internal bearings and O-ring sealing elements in the fluid inducer must be changed, which causes a loss of time. Further, the sealing elements tend to wear grooves on the drill sleeve, thus destroying the fluid seal; therefore, the expensive drill sleeve must be discarded. Also, when the inducer is removed to change the 0-rings, the bearings are often damaged.

There exists a need for a fluid inducer and drill sleeve which when used together provides easy removal of bearing and sealing elements, and provides an improvement such that if a sealing element wears on the drill sleeve the drill sleeve does not have to be discarded.

SUMMARY OF THE INVENTION

The present intention has been designed to overcome the foregoing deficiencies and meet the above described needs. Specifically, the present invention is a fluid inducer, for use with an oil-hole drill sleeve, that can be easily disassembled to permit ease of removal and replacement of sealing elements and bearing assemblies. A cylindrical main inducer body has an inner bore that includes at least two spaced 0-rings adapted to receive a position of the drill sleeve therein. A cylindrical bearing body has an inner bore with a mechanism for retaining at least one annular bearing assembly and adapted to receive a portion of the drill sleeve therein. The cylindrical main inducer body and the bearing body can be assembled as a single unit around the drill sleeve so that the drill sleeve can rotate therein. The main inducer body can be removed form the bearing body without need for removing the drill sleeve from the drill press, thus saving time and damage to the bearings. Further, a lower portion of the drill sleeve includes a removable sealing cylinder which when it becomes worn can be easily replaced, thus eliminating the need to discard the entire drill sleeve.

DETAILED DESCRIPTION OF THE PREFERRED EMBODIMENTS

As is well known to those skilled in the art, oil-hole drilling comprises introducing a fluid, such as air, water, oil or combinations of these, through a stationary inducer and then into internal channels or bores within the rotating drill bit. The present invention utilizes the same techniques but with the improvements described below.

Figure 1:
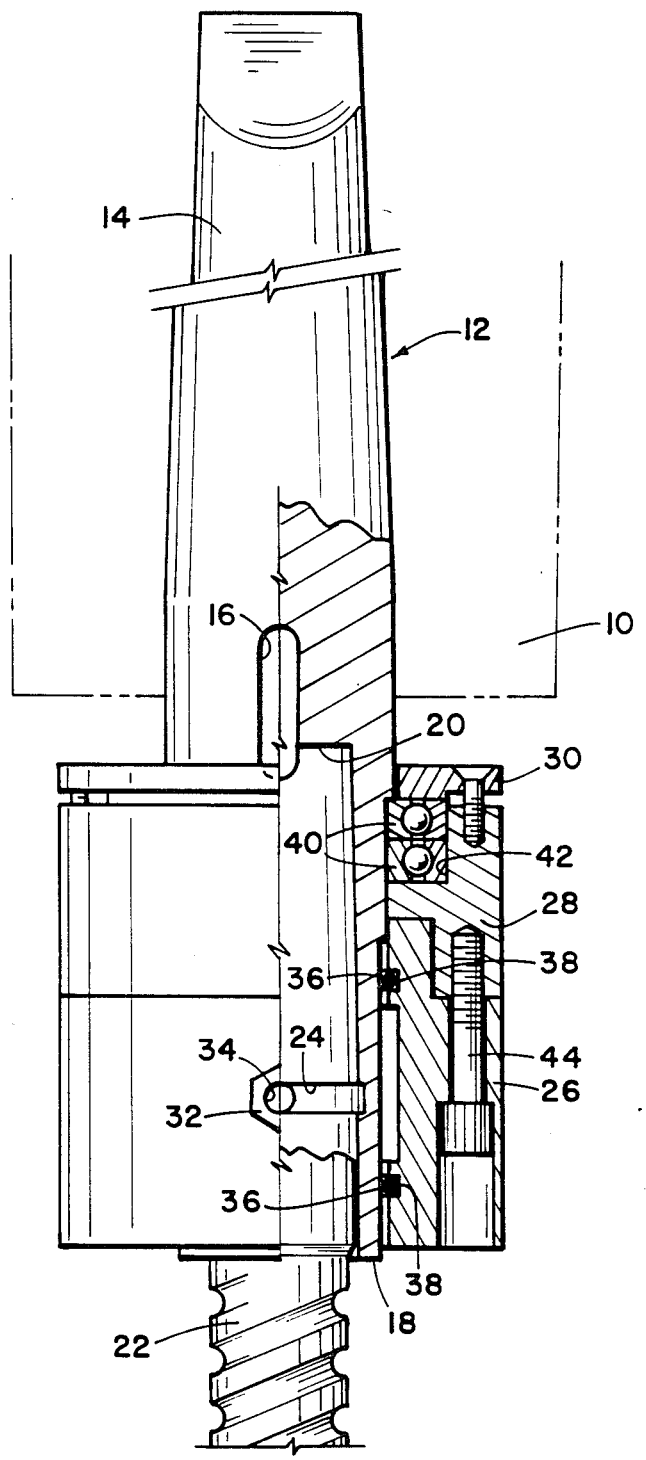
FIG. 1 is a partial cutaway, front elevational view of a fluid inducer, embodying the present invention, mounted on a drill sleeve.

As shown in FIG. 1, a drill press spindle 10 has operatively inserted therein a drill sleeve 12 of the type used with oil-hole drilling. The drill sleeve 12 comprises an upper tapered portion 14, a tangential, horizontal hole 16 for insertion of a mounting shiv, and an elongated lower portion 18. A tapered, coaxial bore 20 is provided within the lower portion 18 of the drill sleeve 12, and is adapted to receive therein an oil-hole drill bit 22, as is well known in the art. Included within the bore 20 is a horizontal annular channel 24, which will be described in more detail below.

A cylindrical main inducer body 26 is connected to a bearing body 28 with a bearing retaining washer or cap 30. Fluid is introduced from a suitable source (not shown) through a fluid connector 32, a horizontal bore 34 in the drill sleeve 12, into communication with the channel 24 and then into the internal bore(s) of the drill bit 22.

To maintain the fluid within the proper confines, at least two spaced horizontal sealing elements 36, such as O-rings, are seated in annular grooves 38 in the interior wall of the main inducer body 26 on either side of the channel 24. To permit the rotation of the drill sleeve within the inducer and to maintain the inducer in position one or more bearing assemblies 40 are press fitted onto the lower portion 18 of the drill sleeve 12. The bearing assemblies 40 are received within a recess 42 in the bearing body 28 and are maintained in position by the cap 30. The main inducer body 26, bearing body 28 and cap 30 can be mounted and connected each to the other in any desired manner, such as by threaded mounts, lug-socket or screws, as shown in FIG. 1.

In the operation of the present invention shown in FIG. 1, the drill sleeve 12 has the cap 30 slipped onto it and then bearing assemblies 40, such as ball bearing races, press fitted thereunto. The drill sleeve 12 can then be mounted, as is well known to those skilled in the art, within the drill press 10. The bearing body 28 is slipped upwardly against the bearing assemblies 40 to securely mount this portion of the inducer about the drill sleeve 12 while permitting the free rotation of the drill sleeve 12 therewithin. After ensuring that the sealing elements 36 are properly seated, the main inducer body 26 is connected, as by screws 44, to the bearing body 28. A conduit or the like (not shown) is connected to the fluid connection 32 and a suitable oil-hole drill bit 22 is mounted within the drill sleeve 12, as is well known to those skilled in the art.

If the sealing elements 36 wear out, then all that is required is that the fluid source be disconnected, and the main inducer body 26 be disconnected to provide easy access to the O-rings 36. This simple operation and arrangement eliminates the need of removing the drill sleeve 12 from the drill press 10, and the drill bit 22, and from having to force the bearings off of the drill sleeve to gain access to the O-rings within the prior art embodiment of a single piece fluid inducer.

Figure 2:
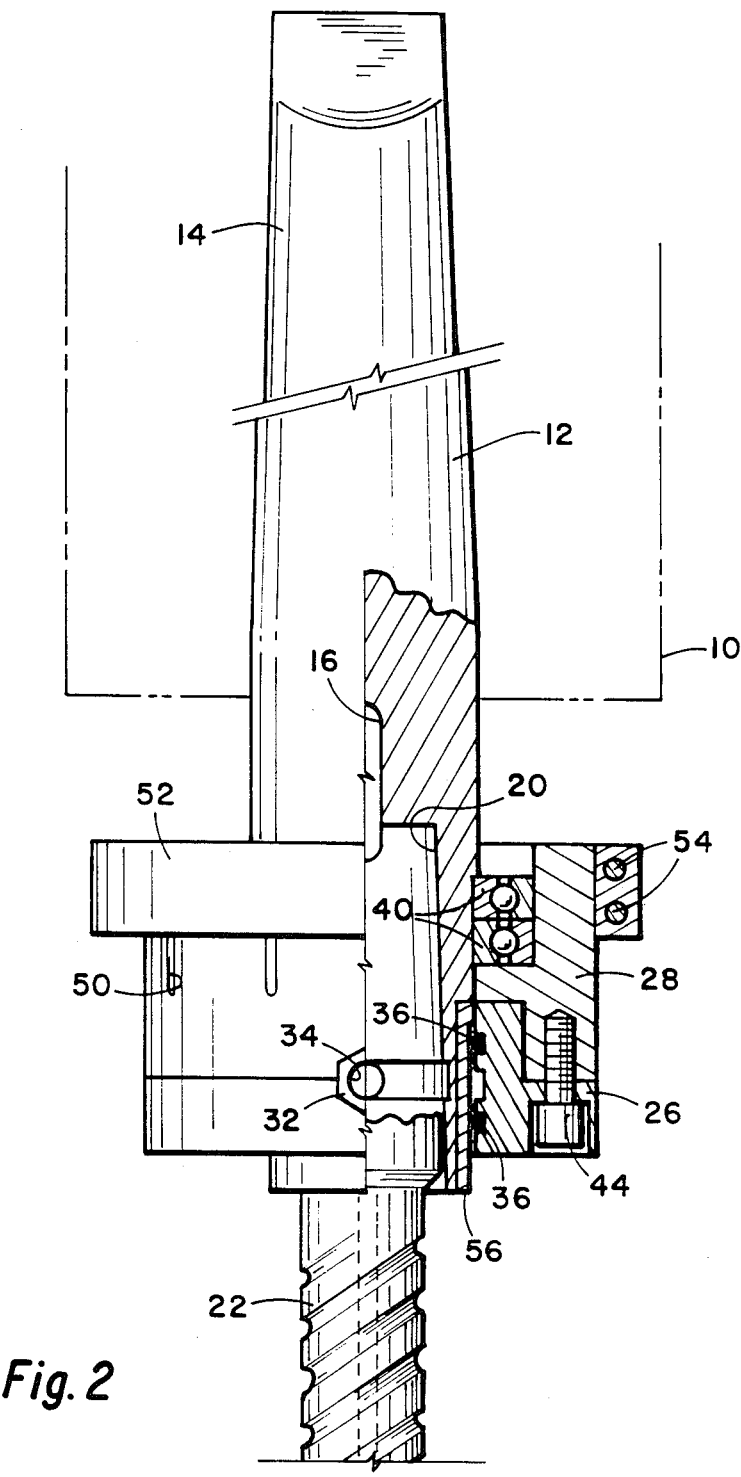
FIG. 2 is a partial cutaway, front elevational view of an alternate embodiment of the present invention.

The embodiment of the present invention shown in FIG. 2 is very similar to that shown in FIG. 1, except that in place of a bearing retaining cap (#30 in FIG. 1) the bearing body 28 includes a plurality of vertical squeeze fit cutouts 50 and an outer squeeze fit band 52 which is tightened around the upper portion of the bearing body 28 by rotation of screws 54 to press against the bearing assemblies 40.

Another important feature that can be included with either embodiment of the present invention (but is only shown in FIG. 2), is that the lower portion 18 of the drill sleeve 12 can be made of smaller diameter and include a press fitted or heat fitted cylindrical sleeve 56 adapted to have the O-rings 36 rotate against. In the event that the O-rings 36 or metal showing here or dirt abrade the sleeve 56 so that a fluid seal is no longer obtainable, the sleeve 56 can be easily removed and a new sleeve 56 mounted, thereby eliminating the requirement of discarding the entire expensive drill sleeve 12.

Wherein the present invention has been described in reference to the drawings attached hereto, it should be understood that other and further modifications, apart from those shown or suggested herein, may be made within the scope and spirit of the present invention.

What is claimed is:

1. A fluid inducer and drill sleeve assembly comprising: a drill sleeve with a removable lower cylindrical sleeve;

a cylindrical main inducer body having an inner bore around which are disposed at least two spaced O-rings and adapted to define an annular space about the removable lower cylindrical sleeve of the drill sleeve;

a cylindrical bearing body having an inner bore for receiving therein an upper portion of the main inducer body and for retaining therein at least one annular bearing assembly mounted to the drill sleeve; and means for interconnecting the cylindrical main inducer body to the cylindrical bearing body.

2. The fluid inducer of claim 1 wherein the cylindrical main inducer body includes means to introduce fluid through the body to an annular space defined between the at least two sealing elements.

3. The fluid inducer of claim 1 wherein the means for removably connecting the cylindrical bearing body to the drill sleeve includes an upper removable bearing retaining cap.

4. The fluid inducer of claim 1 wherein the means for removably connecting the cylindrical bearing body to the drill sleeve comprises an outer squeeze band disposed around the cylindrical bearing body, and means for tightening the band.

* * * * *